United States Patent [19]

Asano

[11] Patent Number: 4,504,729
[45] Date of Patent: Mar. 12, 1985

[54] THREE O'CLOCK WELDING METHOD IN NARROW GROOVE

[75] Inventor: Isao Asano, Kure, Japan

[73] Assignee: Babcock-Hitachi Kabushiki Kaisha, Tokyo, Japan

[21] Appl. No.: 317,544

[22] Filed: Nov. 2, 1981

[30] Foreign Application Priority Data

Nov. 5, 1980 [JP] Japan .................................. 55-154702
Nov. 11, 1980 [JP] Japan .................................. 55-157742

[51] Int. Cl.³ .............................................. B23K 9/16
[52] U.S. Cl. ............................. 219/137 R; 219/60 R; 219/74
[58] Field of Search ................ 219/137 R, 59.1, 60 R, 219/74

[56] References Cited

U.S. PATENT DOCUMENTS

| 1,966,403 | 7/1934 | Durham | 219/137 R |
| 3,576,966 | 5/1971 | Sullivan | 219/137 R |
| 3,842,237 | 10/1974 | Ujiie | 219/137 R |
| 4,356,378 | 10/1982 | Cloos et al. | 219/124.1 |

Primary Examiner—Roy N. Envall, Jr.
Assistant Examiner—Alfred S. Keve
Attorney, Agent, or Firm—Antonelli, Terry & Wands

[57] ABSTRACT

A three o'clock welding method in a narrow groove, wherein a lateral butt welded joint is formed by carrying out welding in a narrow groove. The narrow groove is inclined with respect to the horizontal in such a manner that the center face of substantially parallel upper and lower groove faces is lowered on the initial layer side, when the welding is performed.

13 Claims, 29 Drawing Figures

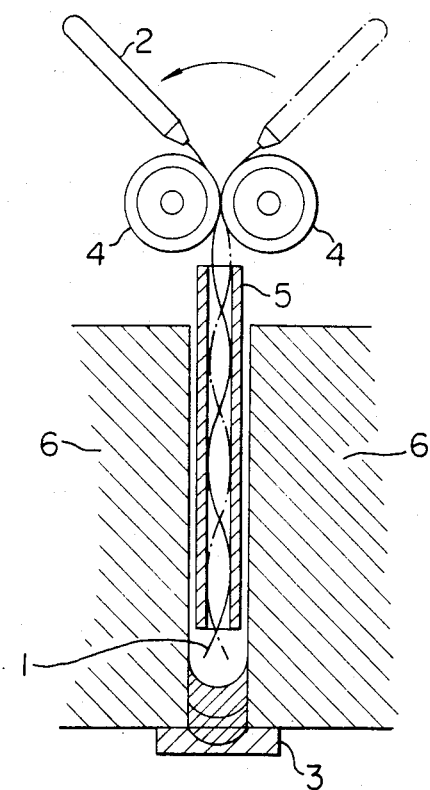
FIG. I
PRIOR ART
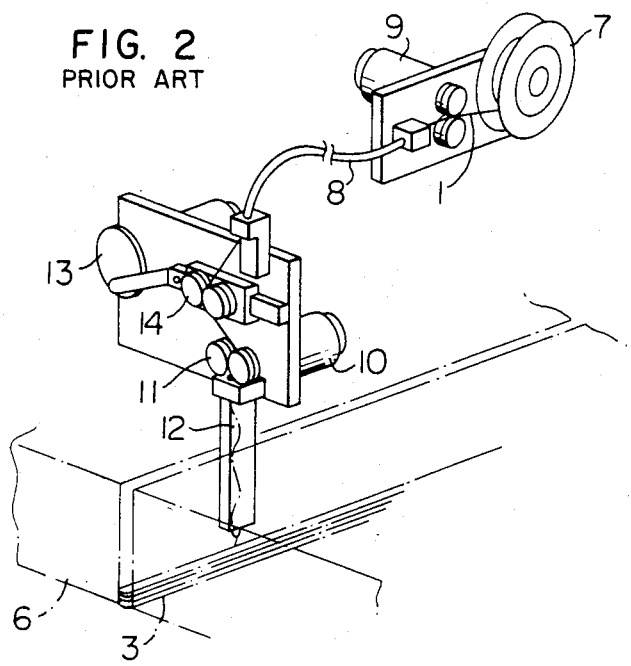
FIG. 2
PRIOR ART

PRIOR ART
FIG. 3
FIG. 4
FIG. 5
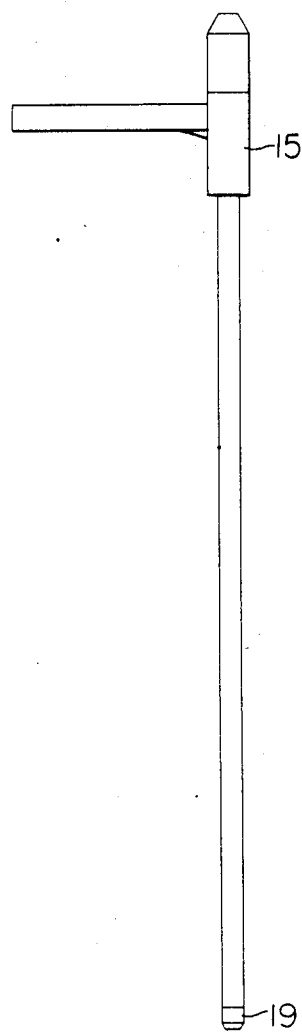
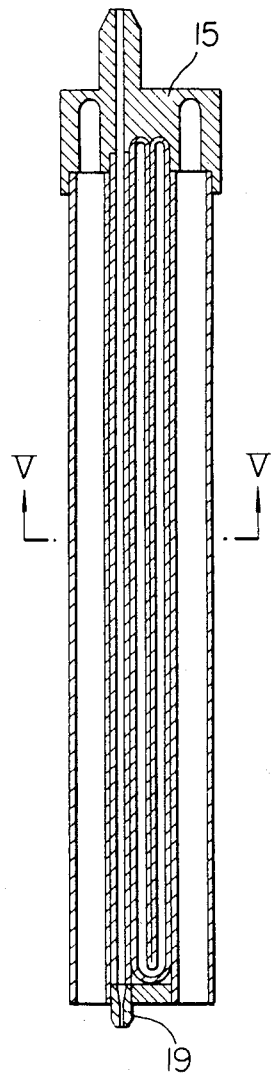
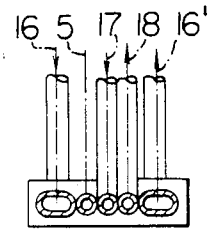

THREE O'CLOCK WELDING METHOD IN NARROW GROOVE

This invention relates to a three o'clock welding method in a narrow groove in which welding wire material formed in wave shape is fed to a contact tube for carrying out three o'clock welding.

An apparatus for carrying out three o'clock welding in a narrow groove disclosed in U.S. Pat. No. 4,188,526 has largely been in use for performing downhand welding, such as stub welding, in thick plates and a header. The welding carried out by using this apparatus best suits the joining by welding of thick plates of narrow groove and can offer the advantages that the deposited metal is small in amount and an sound weld can be obtained by stacking layers of single beads. Thus, the apparatus in conducive to improved quality of the weld, economizing on expenses, shortening the period of time for carrying out work, and the need to expand the scope of applications of the apparatus has been felt.

An object of this invention is to provide a welding method capable of carrying out three o'clock welding by using the aforesaid apparatus.

Another object is to provide a method of three o'clock welding such for carrying out a welding of an upwardly advancing and/or downwardly advancing narrow groove.

A further object is to provide a method of joining a branch pipe to a body or pipes by three o'clock welding in a narrow groove.

The three o'clock welding method in a narrow groove according to the invention is characterized in that the groove includes substantially parallel upper and lower groove faces in which the center face thereof is inclined in such a manner that the initial layer side of lowered with respect to the horizontal.

The method according to the invention for welding an upwardly advancing and/or downwardly advancing narrow groove by three o'clock welding in a narrow groove is characterized in that the amount of ejected shield gas supplied to nozzles located posteriorly and anteriorly of the direction in which welding by a welding torch progresses can be controlled in accordance with the welding position.

The method according to the invention for joining by welding a branch pipe to a base pipe in three o'clock welding is characterized in that an I narrow groove is provided in which the generating lines of an inverted trapezoidal cone surface formed by the center line of the groove cross the center axis at a constant angle at all times and that welding is carried out by GMA welding means.

Other objects, features and advantages of the invention will become apparent from the description of the embodiments set forth hereinafter when considered in conjunction with the accompanying drawings.

FIG. 1 is a fragmentary sectional view of the narrow groove welding means including a contact tube shown in U.S. Pat. No. 4,188,526;

FIG. 2 is a perspective view of the narrow groove welding apparatus;

FIG. 3 is a side view of the welding torch;

FIG. 4 is a vertical sectional view of the welding torch;

FIG. 5 is a sectional view taken along the line V—V in FIG. 4;

DESCRIPTION OF THE PREFERRED EMBODIMENTS

Figure 6:
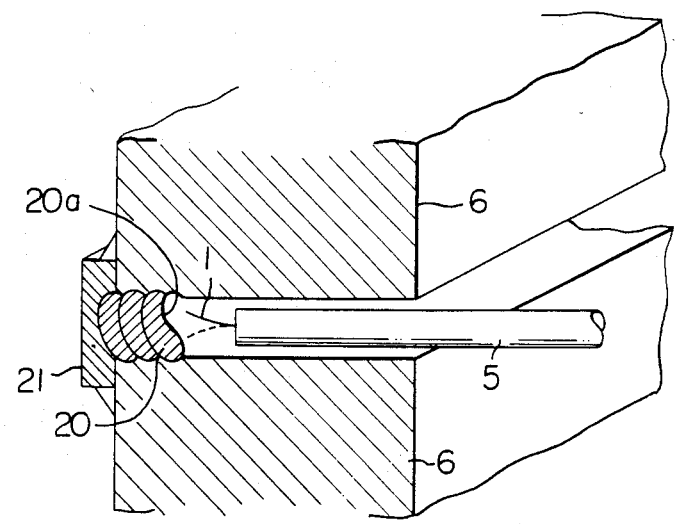
FIG. 6 is a sectional view showing the formation of beads when the center face between the groove faces is horizontal.

Referring to FIG. 1, a welding wire (solid wire) 1 of a small diameter is formed into a wave shape and supplied to a weld zone through a contact tube 5. The wire extending from the forward end of the apparatus is swung rightwardly and leftwardly in FIG. 1 as the welding progresses, to automatically move the arc in swinging movement to give complete penetration to the side wall surface of the narrow groove formed between opposed surfaces of metal members 6 to enable a defectless sound weld or the metal members 6 at a backing material 3.

The welding wire 1 is wound on a wire reel, not shown, and led to wire feed rollers 4 through a swing plate 2, and reaches the weld zone through the contact tube 5 while having a current passed therethrough.

In this process, the welding wire 1 is subjected to plastic deformation by the action of the swinging plate 2 to be formed into a wave shape by using the outer periphery of each feed rollers 4 as a bending guide. When the welding wire 1 reaches the welding section, the welding wire 1 is restored to its original shape to move the arc in swinging movement.

In FIG. 2 the The mechanism for bending the welding wire 1 is distinct from the mechanism shown in FIG. 1 and bending is effected by a swinging movement of the bending rollers 14. The swinging movement of the bending rollers 14 is caused by an eccentric drive 13 connected with bending rollers 14, with the wire 1 being fed to the welding torch 12 by wire feed rollers 11 driven by a drive motor 10. The wire 1 is fed from a feed roller 7 by a drive means 9 through a guide tube 8 to bending rollers 14. However, the two mechanism have the same object of forming the welding wire 1 into a wave shape.

As shown in FIGS. 3, 4 and 5, the welding torch 12 is composed of the contact tube 5, colling water feed pipes 16, 17, a cooling water return pipes 16', 18, an upper block 15 and a contact tip 19.

When the welding torch 12 of this construction is used for carrying out welding in one direction only, the welding torch is usually used by keeping the flow rate of gas constant in the forward and backward direction.

When the side surface of the groove face is horizontal as three o'clock welding is carried out by using the narrow groove welding apparatus of the aforesaid construction, bead formation will be as shown in FIG. 6 in which as welding progresses from the initial layer bead in contact with a backing strip 21 and the surfaces 20a of the beads 20 gradually show tilting as the number of layers increases, due to the balancing between the force of gravity to which molten metal is subjected and surface tension, the inert gas velocity released from the nozzle and the cooling speed, until finally a narrow groove welding is made impossible to carry out by the stacked layers of single pass as shown.

Figure 7:
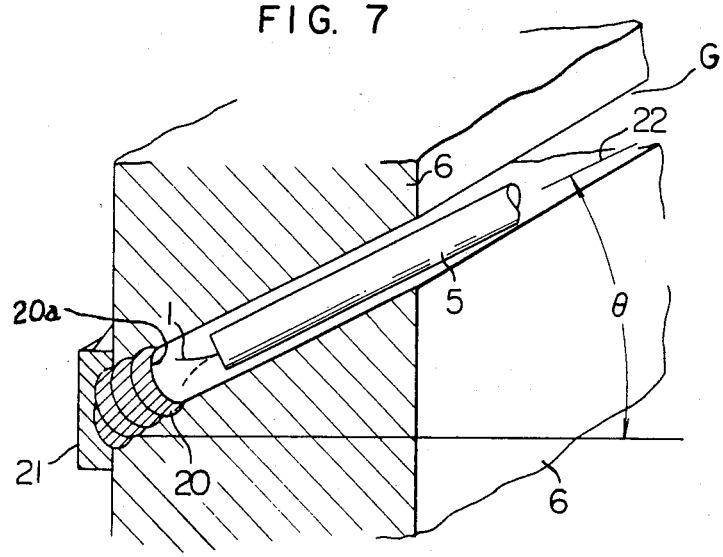
FIG. 7 is a sectional view showing the groove shape according to the invention and the manner in which bead formation takes place.

In view of the foregoing, an imaginary center face was set substantially midway between opposite sides of the groove and experiments and measurements were conducted on the inclination of the center face and formation of the surfaces of the beads. 6 mm was selected as a minimum dimension of a gap in view of the minimum essential width (that enables the contact tube to enter the gap of the groove) of the contact tube of the apparatus in relation to the swinging of the end portion of the welding wire or the arc generating point. Meanwhile, 12 mm was selected as a maximum dimension of the gap in view of the need to minimize deposited metal and increase the effects achieved in saving time and material by carrying out narrow groove welding by a single pass. With regard to the angle of inclination of the bead surface 20a, it ascertained that as shown in FIG. 7 an optimum zone exists with respect to the gap G for the angle of inclination $\theta$ formed by a center face 22 and the horizontal for carrying out narrow groove welding by a single pass, in view of the inert gas ejection velocity from the nozzle, the relation between the temperature for producing molten metal and surface temperature and cooling velocity (by the base metal). It was also ascertained through experiments that this zone is a hatched zone shown in FIG. 8 which is bounded by A and B curves (the a curve indicating an upper limit and the B curve a lower limit).

The lower the surface tension of the molten metal, the greater the angle of inclination. The provision of an inclination of over 45° is undesirable because the amount of deposited metal increases in the same fashion as when the plates to be welded have their thickness increased. Even if the groove is as shown in FIG. 6, when the members 6 to be welded are such that the base material can be tilted, it is possible to carry out welding by tilting the base material to thereby tilt the center face of the groove.

Figure 9:
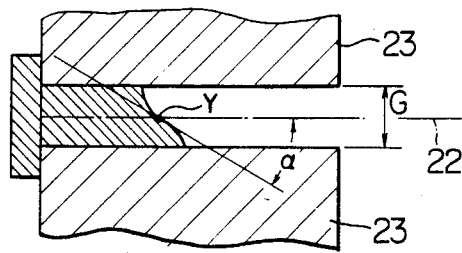
FIG. 9 is a sectional view of a test piece used for setting the angle of inclination.

In respect of the angle of inclination $\theta$, the angle of inclination $\theta$ can be decided by setting a test piece to a gap G corresponding to the gap to be joined and forming beads with three to four passes by placing the center face of the groove horizontal, so that the angle $\alpha$ formed by the tangent (shown in FIG. 9) of a curve indicating the bead surface at a point (with respect to a cross section) Y at which the weld bead surface of the final bead (the fourth bead, for example) and the center face of the groove intersect each other can be checked by the cut surface of the test piece. In this case, it is essential that attention be paid to the fact that the velocity at which inert gas is ejected from the nozzle is an important factor is deciding the angle of inclination $\theta$.

The conditions under which the aforesaid welding method was performed where as follows Base material: SA 299 (ASME) SB 49 (JIS)
Current: 220a Voltage: 26 V,
120 Hz pulse: Welding wire diameter: 1.2 mm
Wire material: MGS 50 (carbon steel wire)
Inert gas: argon gas containing 20% $CO_2$ fed at 25 l/min
Welding velocity: 250 mm/min
Range suitable for practical use $\theta$ is below 45 degrees
Groove gap dimension: 8–12 mm.

Figure 8:
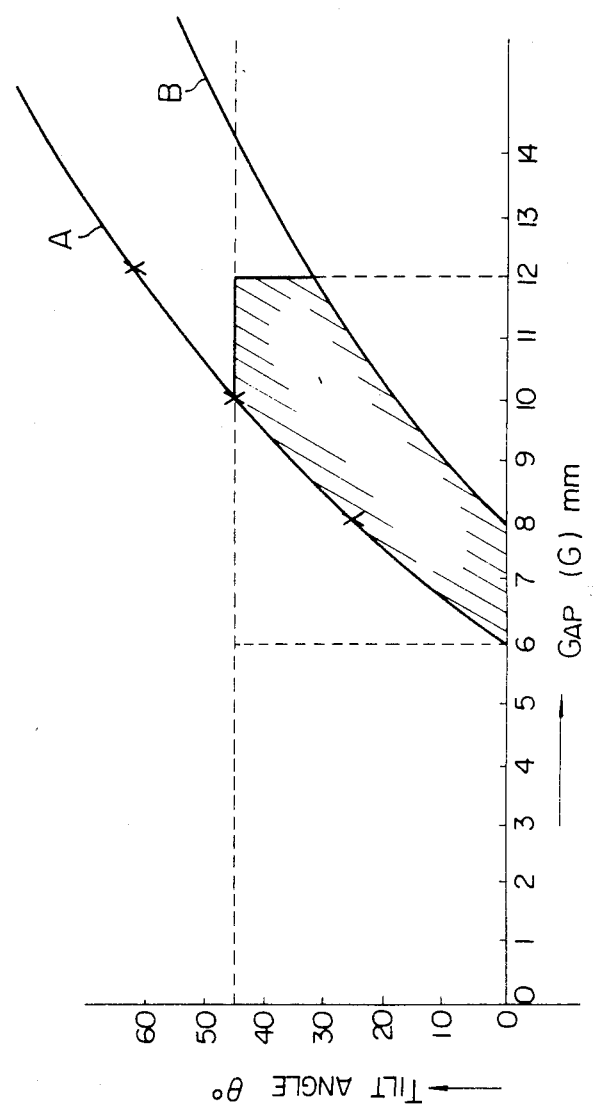
FIG. 8 is a view showing the relation between the gap G and the angle of inclination $\theta$ of the center face and a region suitable for working the invention.

Under these conditions, the hatched zone shown in FIG. 8 was found to be optimum for effecting welding in relation to the angle of inclination $\theta$ and the groove gap (G) dimension.

Generally, it is necessary that the angle of inclination $\theta$ be set at a large value when the molten metal tends to flow and the heat is transmitted poorly to the base material. Thus, it is necessary that the velocity at which the inert gas is ejected from the nozzle be slightly increased.

By working this invention, three o'clock welding in a narrow groove can be readily carried out merely by rendering the groove a simple I square butt joint or substantially parallel sided narrow groove and setting the angle of inclination in accordance with the gap size. In inert gas metal arc welding, the invention enables the effects of holding the inert gas to be readily achieved and allows inert gas atmosphere to be readily formed, so that automatic welding can be readily performed by supplying the welding wire smoothly. Thus, the invention can achieve the results of improving the quality of the weld and economizing on expenses.

Figure 10:
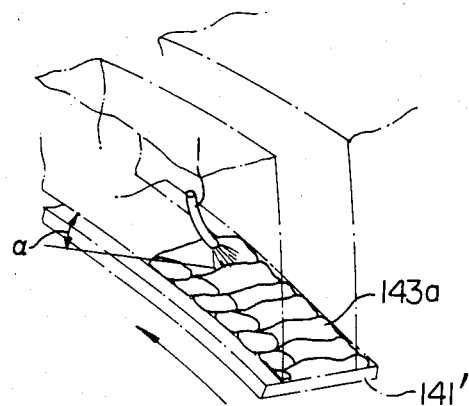
FIG. 10 is a perspective view of a model of upwardly advancing welding.
Figure 11:
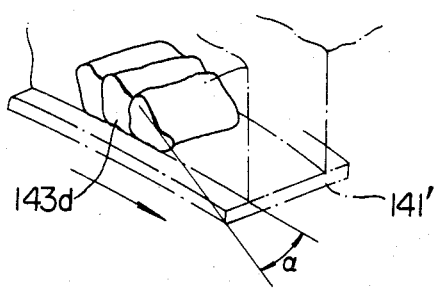
FIG. 11 is a perspective view of a model of downwardly advancing welding.
Figure 12:
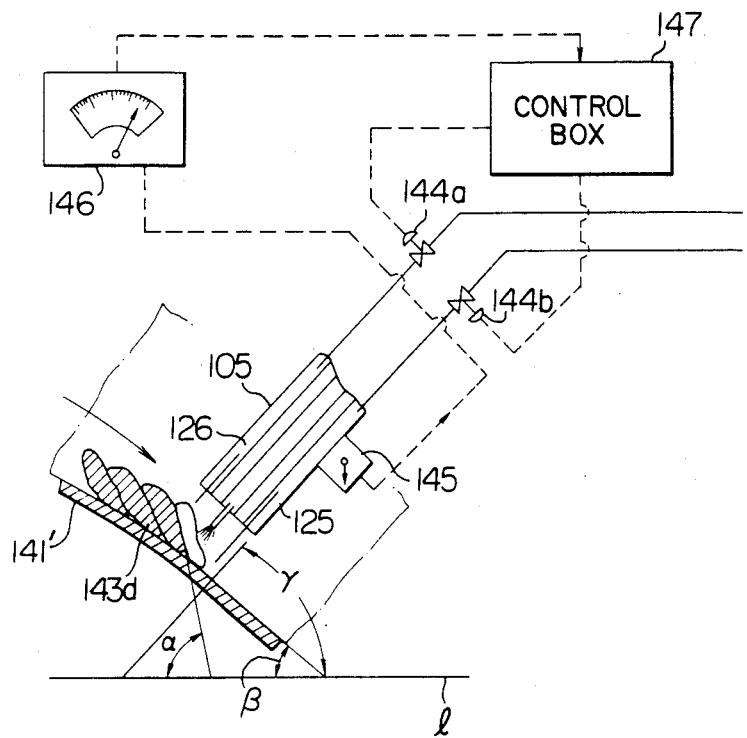
FIG. 12 is a view in explanation of the apparatus according to the invention.

An embodiment of a method of and an apparatus for carrying out three o'clock welding in an upwardly advancing and/or downwardly advancing narrow groove is shown in FIG. 10, wherein a backing material 141' is joined to the members by beads 143a inclined at their surface by an angle $\alpha$. FIGS. 11, 12 show the apparatus suitable for working the invention which is shown as carrying out downwardly advancing welding. In this case, a bead 143d is inclined at its surface at an angle α with respect to the horizontal 1 and the backing strip 141' is inclined by the angle of inclination β in that portion while the center axis of the contact tube 105 is inclined by γ with respect to the horizontal. Thus, γ is associated with β and the condition for preventing the downflow of the molten metal for forming the beads or the condition for pushing up the bead face is mainly determined by the angle γ. This can be decided by the result of a test using a test piece shown in FIG. 9 in which the center face 22 is welded by causing same to tilt not only with respect to the horizontal but also at various angles and by the result of a test in which the angle β is varied with respect to the test piece.

In avoiding the downflow of the molten metal, the amount of the ejected gas can be controlled by increasing the amounts of gas ejected through an anterior gas ejection port (hereinafter referred to as a nozzle) 125 and a posterior gas ejection port or nozzle 126 or the amount of gas ejected through the nozzle 125. Control of the amount of the ejected gas can be effected by adjusting shield gas flow rate control valves 144a and 144b. The contact tube 105 has mounted thereon a tube tilting angle generator 145 generating tube tilting signals which are transmitted to a control box 147 via an angle indicator 146. Information on the amounts of the inert gas ejected through the nozzles 125 and 126 with respect to the angle of inclination γ of the contact tube 105 obtained by the experiments is stored in the control box 147, so that it is possible to adjust the shield gas flow rate control valves 144a and 144b in such a manner that the inert gas can be ejected through the nozzles 125 and 126 in amounts optimum for the angle of inclination γ. The tube tilting angle generator 145 may be attached to an end (not shown) of an arm connected to the welding torch so that it will move along the outer surface of the members to be welded or along the leading bead face.

Figure 13:
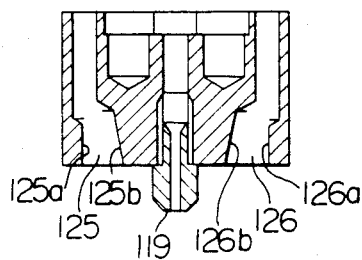
FIG. 13 is a fragmentary sectional view of the vicinity of the gas ejection parts or nozzles.

FIG. 13 shows the detailed construction of the contact tube 105. Optimum results can be achieved in working the invention by forming the shield gas ejection ports or nozzles 125 and 126 as having diversion type openings and by tilting the contact tube 105 in such a manner that in a vertical section including the center axis of the contact tube, sectional walls 125a and 126a of all the walls of the opening which are remote from the center axis of the contact tube are parallel to the center axis and sectional walls 125b and 126b which are near to the center axis are inclined in a manner to have their end portions disposed close to the center axis.

Figure 14:
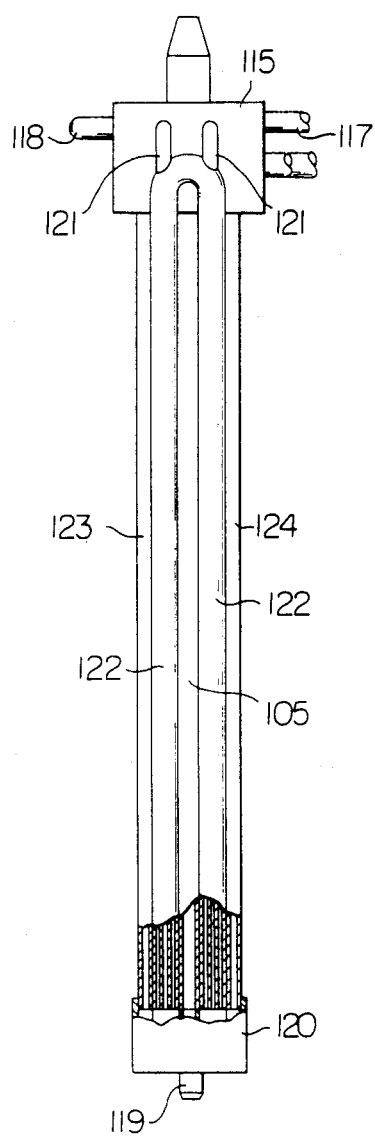
FIG. 14 is a fragmentary sectional view of the welding torch in which the water cooling tube is in the form of a double tube.
Figure 15:
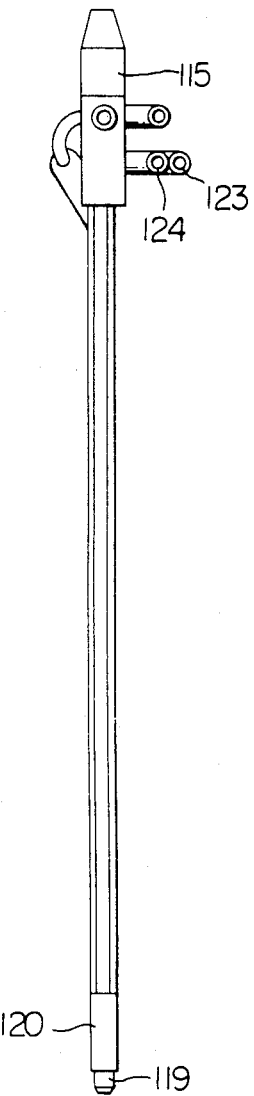
FIG. 15 is a sectional side view of the welding torch shown in FIG. 14.

As shown in FIGS. 14 and 15, the cooling water tube is preferably formed in a double tube construction in which a cooling water feeding tube 117 and a cooling water return tube 118 are formed as an inner tube and an outer tube respectively within the contact tube portion so that the cooling water will flow by changing its direction in the end portion near the contact tip 119.

By working the invention, it is possible to achieve the effects of welding of a saddle type groove, such as a connection between a header and a stub, which has an upwardly advancing portion and a downwardly advancing portion, to be carried out readily and automatically under optimum conditions.

Figure 16A:
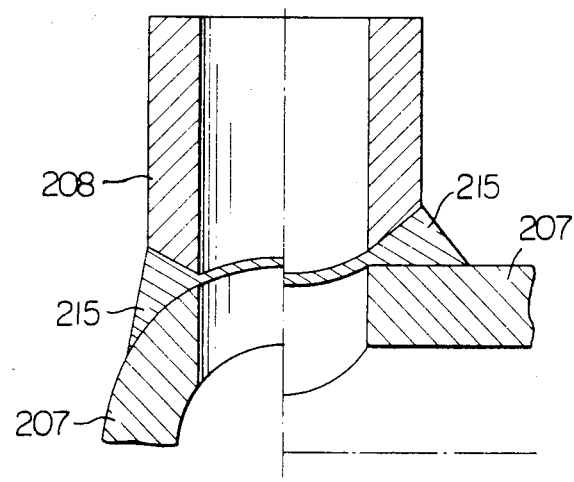
FIG. 16A is a sectional view of a base tube and a branch tube showing a welding method of the prior art.
Figure 16B:
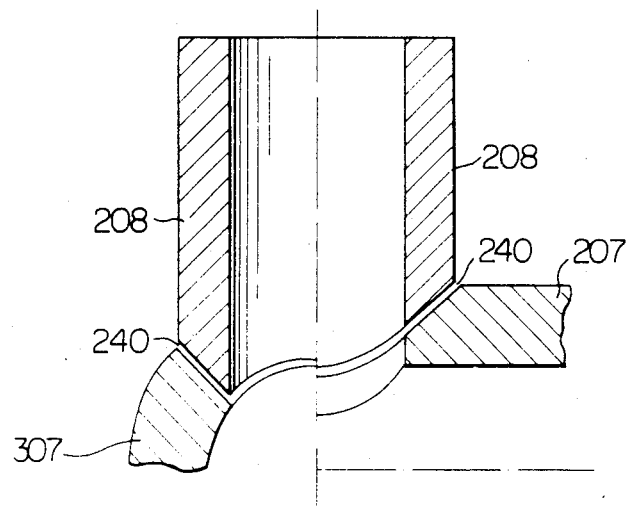
FIG. 16B is a view of a base tube and a branch tube showing the welding method according to the invention.
Figure 17:
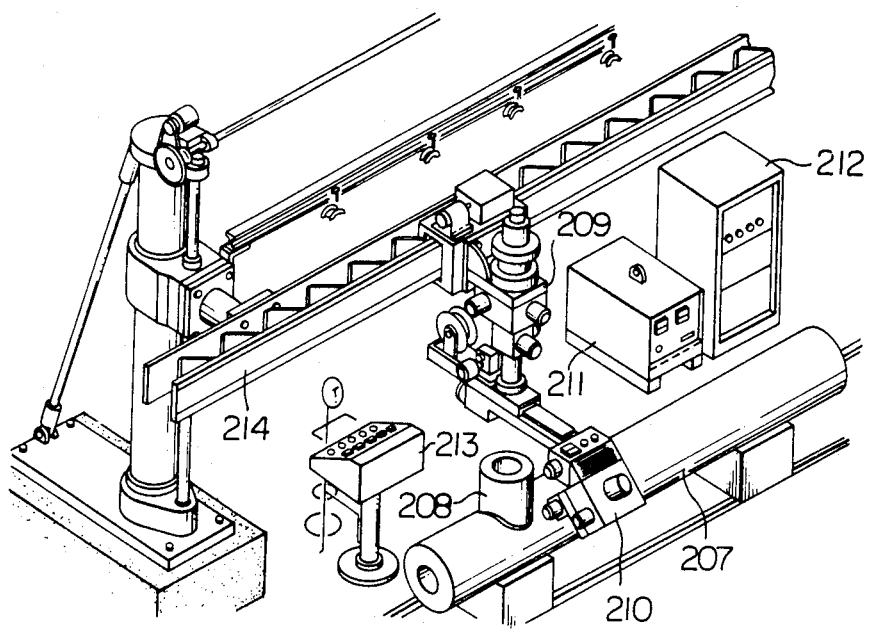
FIG. 17 is a perspective view of the apparatus for carrying out automatic welding.
Figure 18:
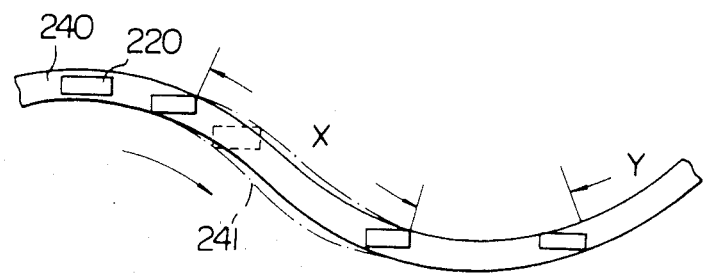
FIG. 18 is a view of a model showing the movement of a welding torch of the prior art.
Figure 21:
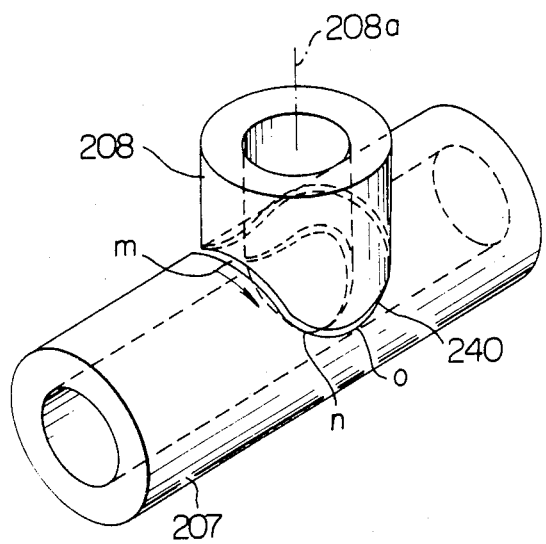
FIG. 21 is a perspective view showing a branch tube joined to a base tube.

An embodiment of an apparatus for welding a narrow groove suitable for carrying out three o'clock welding in which the center line of the groove is a curve displaced in a horizontal direction and/or a vertical direction as shown in FIG. 21 will now be described. A method of the prior art for welding a branch tube to a base tube shown in FIGS. 16A and 16B will be outlined. As shown, the left half portion of the figure with respect to the center line shows a circumferential section and the right half portion thereof shows a longitudinal section. In FIG. 16A, a branch tube 208 is placed on a base tube 207 and a deposited metal 215 is provided to a groove formed on the branch tube 208, in carrying out welding. Since the groove is a saddle type and has a complex shape, welding of the groove has been performed manually, as by gas cutting, in the majority of the work done for preparing the edge. Thus, both edge preparation and welding have hitherto required a lot of labor and a long period of time. In some applications, a submerged arc welding process or a short arc welding process has been adopted for carrying out welding by mechanically synchronizing vertical movement to rotation. FIG. 17 provides and example of a welding apparatus for carrying out a mechanical welding process in which a groove formed between the base tube 207 and the branch tube 208 is automatically welded by controlling a welding head 210 by the control box 212 via a saddle shape swiveling mechanism 209 and a side beam 214. 211 is a transformer for the welding power source and 213 a control panel. The movement of the welding head poses the problem that misoperation or trouble is liable to occur due to the facts that the members to be welded have different sizes and the welding conditions are complex. When the groove has a large width, the problem arises that the welding bead sags and drops. In the present invention, lateral narrow grooves parallel in widthwise direction have been developed as shown in FIG. 16B in order mainly to avoid sagging of the welding bead and increase the strength of the weld. More specifically, a groove is formed in each of the base tube 207 and the branch tube 208 to provide a groove 240 of constant width through the entire circumference. This facilitates automating of welding. One problem is raised in this connection. Since the welding torch is fixed with respect to the welding head, the welding torch 220 would become impossible to move in X and Y sections when the groove 240 draws a curve as shown in FIG. 18. This has hitherto made it necessary to provide a wide space for these sections of the groove, as indicated by the numeral 241.

The invention has succeeded in eliminating the disadvantages of the prior art and making it possible to carry out welding economically with minimized expenses, to obtain a weld of high reliability by providing an essential minimum of the groove width, even if the center line of the groove is a curve displaced in a horizontal direction and/or a vertical direction.

Figure 19:
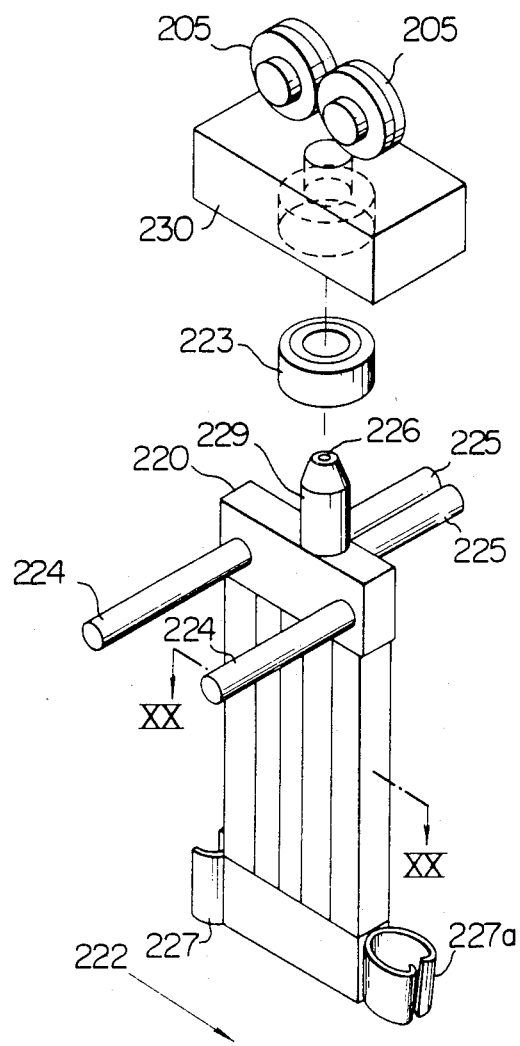
FIG. 19 is an exploded perspective view of the welding apparatus according to the invention.
Figure 20:
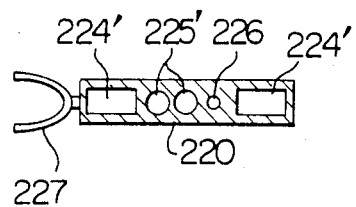
FIG. 20 is a sectional view taken along the line XX—XX in FIG. 19.

Referring to FIG. 19, a boss 229 is formed in the welding torch 220 and has a passageway 226 in the central portion for allowing the welding wire to pass therethrough. A welding head 230 is provided with feed rollers 205 for feeding the welding wire. A swivel ring 223 is fitted over the boss 229 of the welding torch 220 and the welding head 230 so that the welding head 230 supports the welding torch 220 in swiveling movement. The welding torch 220 is formed at lower portion thereof with a substantially U-shaped profiling plate 227 located on the rear side wall which is the trailing end with respect to the direction of movement of the welding torch 220. The profiling plate 227, which has substantially the same width as the groove, is adapted to come into contact with the groove as the welding torch 220 moves within the groove, so as to thereby correctly position the welding torch 220 with respect to the groove at all times. The profiling plate 227 may be replaced by guide plates 227a connected to the trailing side wall and/or the leading side wall of the welding torch 220. The guide plates 227a are normally located in the leading end portion of the welding torch 220 with respect to the direction of movement 222 thereof. The guide plates 227a may be of the same shape as the profiling plate 227 or a substantially of a pear shape, in which the open sides of the substantially U-shaped guide plate are bent inwardly. By using this construction, contact of the welding torch 220 with the groove face as shown in FIG. 18 can be avoided. In FIG. 19, 224 is a shield gas supply tube, and 225 a cooling water tube. In FIG. 20, 224' is a shield gas passageway, and 225' a cooling water passageway. FIG. 1 shows one example of the method for feeding a welding wire in the welding head 220 shown in FIG. 19 which is based on a narrow groove welding method disclosed by the present inventor previously. This method which is a variation of the GMA welding method enables the swing plate 2 to move in swinging movement as indicated by arrows as the welding wire 1 passes through the swing plate 2 and is forced into the contact tube (welding torch) 5 by the feed rollers 4. This permits the feed rollers 4 to act as a bending die, to deform the welding wire 1 into a wave shape. As a result, the welding wire 1, forced out of the contact tube 5, moves in swinging movement without having any directionality at the arc generating point, thereby enabling welding to be performed without any trouble, such as a lack of penetration with respect to the side wall surface of the groove.

Figure 22:
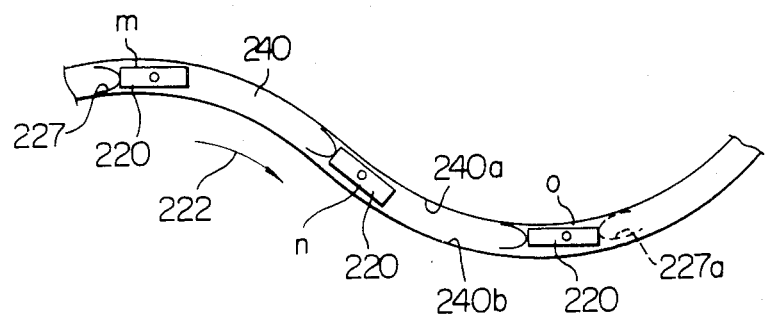
FIG. 22 is a view of a model of the groove shown in FIG. 21.

FIG. 21 shows one example of a narrow groove in which the direction of welding is a curve displaced both in the horizontal direction and the vertical direction, for joining the branch tube 208 to the base tube 207 by welding. The groove is a saddle type groove having a constant width, as shown in FIG. 16B. In this case, the width of the groove can be reduced to an essential minimum value (6-15 mm, for example) because the apparatus according to the invention is capable of moving freely within the groove. The saddle type groove shown in FIG. 16B is such that the angle at the center of the groove is constant with respect to the center axis 208a of the branch tube 208, so that the welding torch has only to move vertically and in rotary movement. FIG. 22 shows in a model the manner in which the torch 220 moves within a groove 240 shown in FIG. 21 with respect to the direction of movement of the torch 220. In FIG. 22, m, n and o indicate the points in the groove shown by the same numerals in FIG. 21. In this case, the profiling plate 227 causes the welding torch 220 to be displaced for movement along the groove 240 while keeping the open sides of the U-shaped shape in contact with side walls 240a and 240b respectively, of the groove space 240.

By working the invention, it is possible to freely move the welding torch in a lateral narrow groove of which the center line of the groove forms an indefinite curve. Thus, it is possible to carry out welding of the lateral narrow groove of complex shape by means of an automatic welding machine efficiently and positively.

Figure 25:
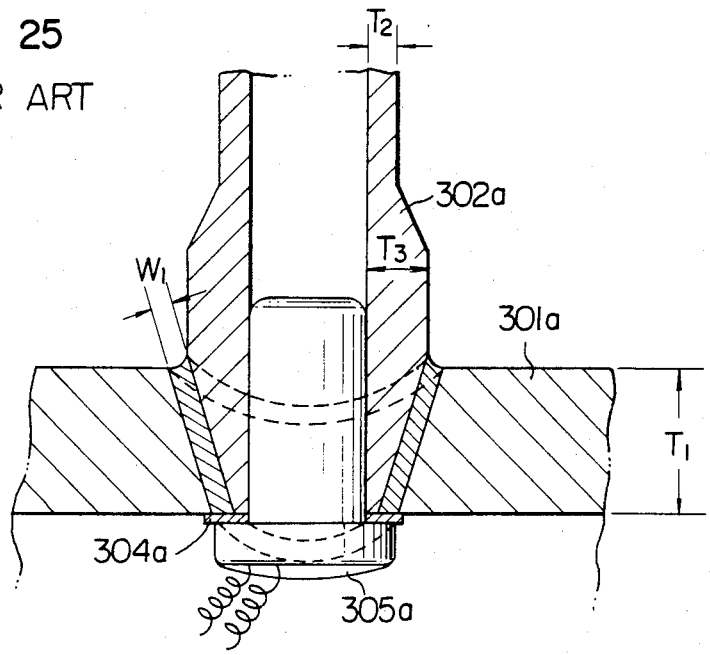
FIG. 25 is a vertical sectional view of a weld between a branch tube and a base tube of large thickness.

FIG. 25 provides an example of a prior art welding method for welding a branch tube 302a, having a thickness $T_2$ and $T_3$, to a base tube 301a having a thickness $T_1$, with a backing strip 304a being welded to the members. An electric heater 305a is provided for heating portions of the weld zone to prevent a cracking or other weld defects. The weld groove between the branch tube 302a and base tube 301a has a width $W_1$.

Figure 23:
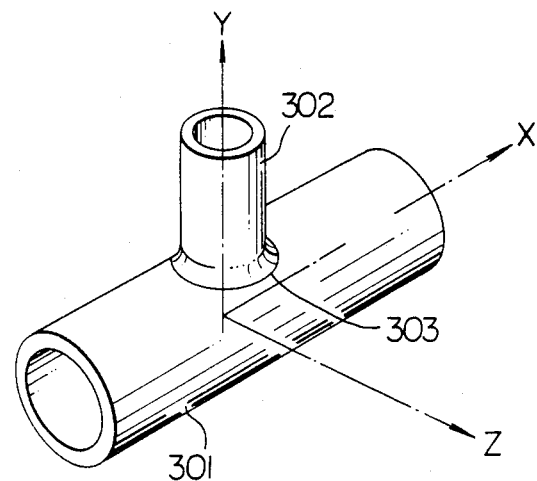
FIG. 23 is a perspective view of a branch tube welded to a base tube.

As shown in FIG. 23, in a boiler for a generating plant, pressure vessel of a nuclear reactor, pressure vessel of a chemical plant, etc., a branch tube 302 is connected to a base tube 301 in such a manner that the center axis of the former is at a right angle to that of the latter in many cases.

Generally butt welded joints are in many cases such that the groove faces of the members to be butt welded have the same shape and the center line of one groove and the center line of the other groove are in one plane as in joining flat plates together by welding. In the butt welded joint formed in connecting a branch tube to a base tube as described hereinabove, the weld line is a curve of the saddle shape because the cylindrical branch tube 302 is attached to the outer surface of the base tube 301.

Figure 24:
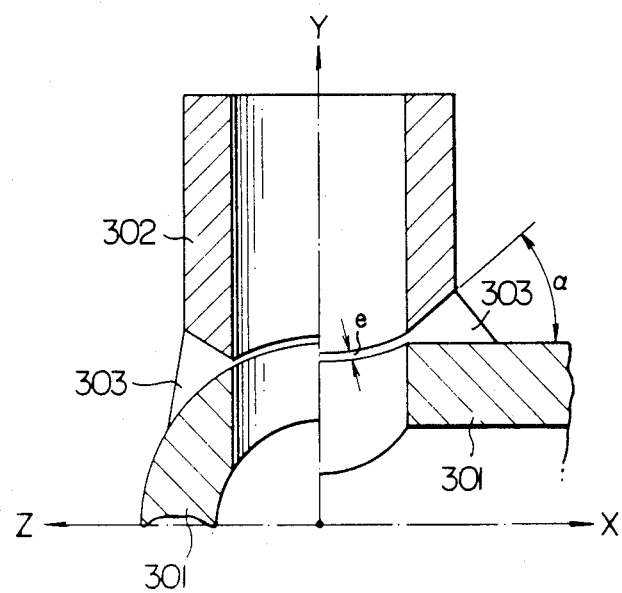
FIG. 24 is a sectional view of a branch tube connection using a welding means of the prior art in which the right half portion is the X-Y section of FIG. 23 and the left half portion is the Y-Z section of FIG. 23.

The shape of a groove to be welded (including a shape corresponding to the numeral 303 and a gap O in FIG. 24) raises the problem that the curve is so complicated in shape that it shows a stepless change in saddle shape from the top of the longitudinal extension of the base tube 301 to the bottom thereof as seen peripherally and the center line of the groove does not exist in the same plane.

Because of this complicated shape, the groove has no definite mathematical and graphic principles and defies machining. Although gas cutting operation may be adopted in some applications, working and finishing must rely on manual operation after all in many applications.

Figure 26:
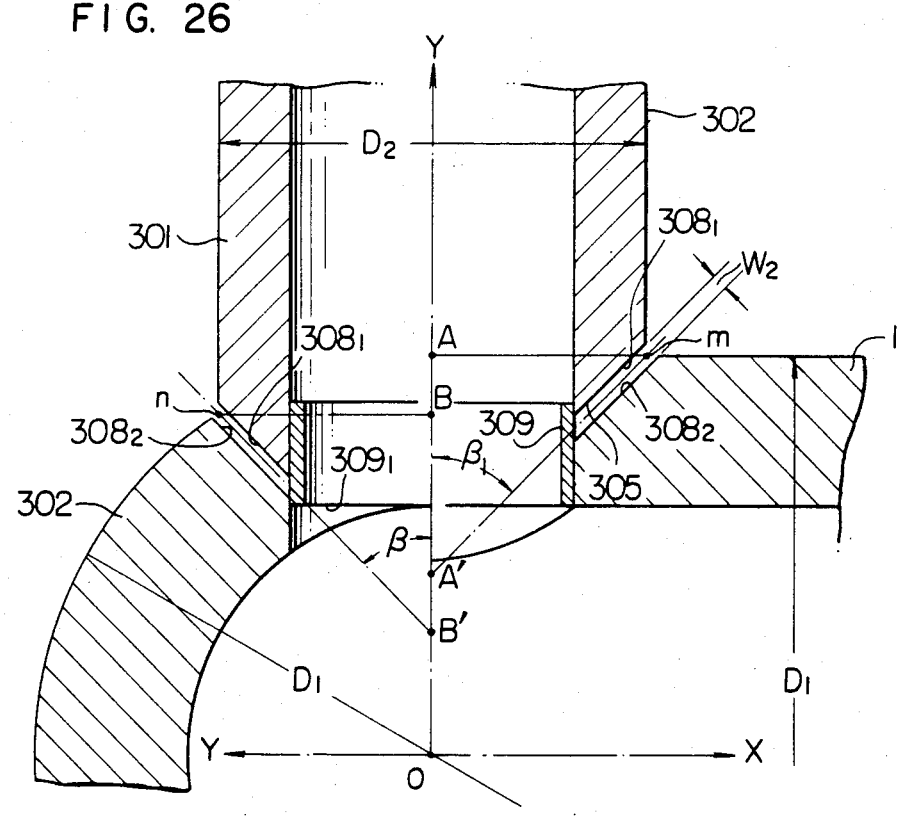
FIG. 26 is a sectional view corresponding to FIG. 24 and including narrow groove according to the working of the invention.

In FIG. 26, an X-Y section (right half portion) is a longitudinal section of the base tube and an X-Z section (left half portion) shows one-half the transverse surface of the base tube which is a peripheral section thereof.

Figure 27:
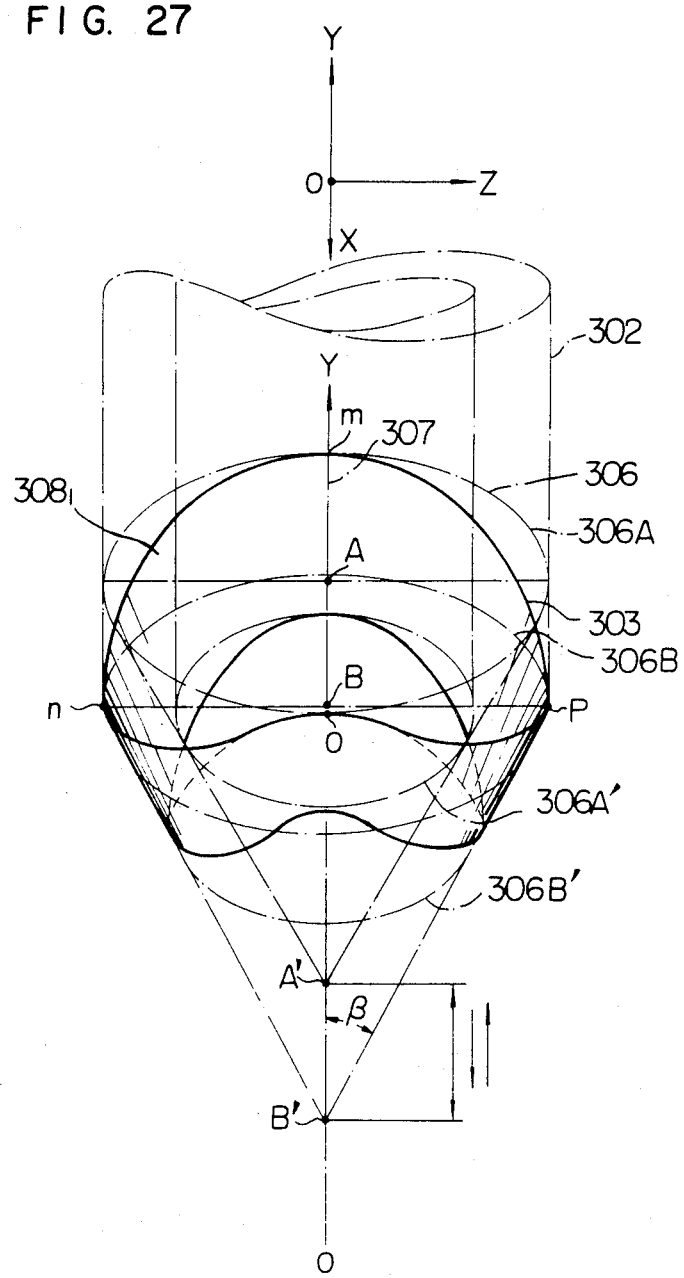
FIG. 27 is a perspective view of a saddle-like curve of the end face of a branch tube.

In accordance with the present invention a GMA automatic welding apparatus is provided in which the welding wire 1 is fed to the contact tube (shown at 5 in FIG. 1) for welding thick plates with a narrow groove of less than 10-8 mm. In using this machine, it is necessary that the groove face be formed on the basis of mathematically and graphically established principles. Also, the center axis of the contact tube 5 is required to change its position about the center axis at a constant angle $\beta$ with respect to the center axis (Y-axis) of the branch tube. It is inevitable that if the base tube of a larger diameter is joined to the branch tube of a smaller diameter, the weld line be saddle shape. Forming of the weld line of the saddle shape will be described graphically by referring to FIG. 27. The numeral 306A indicates in phantom lines an inverted trapezoidal cone 306 having a bottom surface of the same outer diameter as the branch tube 302 and a vertical angle of $2\beta$. In the inverted trapezoidal cone 306, the bottom face having the same diameter as the inner diameter of the branch tube 302 is designated by the numeral 306A'. FIG. 27 shows in a perspective view (in phantom dot-and-dash lines) the phantom inverted trapezoidal cone as it is forwardly inclined with respect to the perpendicular. The numeral 307 designates one of the generating lines of the inverted trapezoidal cone. In this case, when the center of the bottom surface is moved in one reciprocatory movement the distance between position A and position B or a constant distance while the inverted trapezoidal cone (hereinafter referred to as a cone)

rotates through 180° with the axis O-Y as the center axis and it is moved in another reciprocatory movement between positions A and B while the cone further rotates through 180 degrees, a curve m, n, o, p, m described by an end m of the generating line 307 is the line of the saddle shape of the weld line 303. The relation between m and n or the dimension between A and B is decided by the diameter $D_1$ of the base tube and the diameter $D_2$ of the branch tube. An end face $308_1$ of the branch tube moving in the saddle shape is formed by the saddle-shape movement of the generating line 307 and its perspective view is shown by a curved surface drawn by a solid line. When a face $308_2$ having a width $w_2$ is formed on the base tube side corresponding to the end face $308_1$ of the branch tube, it is possible to form either by machining or by means of a gas cutting torch a narrow groove of the width $w_2$. In FIG. 27 the depth of the weld groove is identical with the length of the generating lines of the inverted trapezoidal cone which lines are defined between the cone bottom face 306A having the same diameter as the outer diameter of the branch tube 302 and the bottom face 306A' having the same diameter as the inner diameter of the branch tube 302 with respect to the points (m) and (o). Similarly, the length of the generating lines between the bottom faces 306B and 306B' with respect to the points (p) and (n) in the weld line is equal to the depth of the weld groove. Machining can be carried out with a high degree of precision to give the value of 10-8 mm to the width $w_2$, and the angle of inclination $\beta$ of the generating line 307 with respect to the center axis can be made constant. Stated differently, the groove of the small width of this type can be given with accurate shape and configuration, to facilitate GMA automatic welding of the narrow groove.

By adopting this groove, it has become possible to use a backing strip 309 of small thickness tube shape shown in FIG. 26 as a backing strip for welding. As shown, an end portion $309_1$ on the base tube side may not stick out of the inner surface of the base tube and may remain inside the branch tube depending on the condition of the fluid. Alternatively, this portion can be removed by machining.

Figure 28:
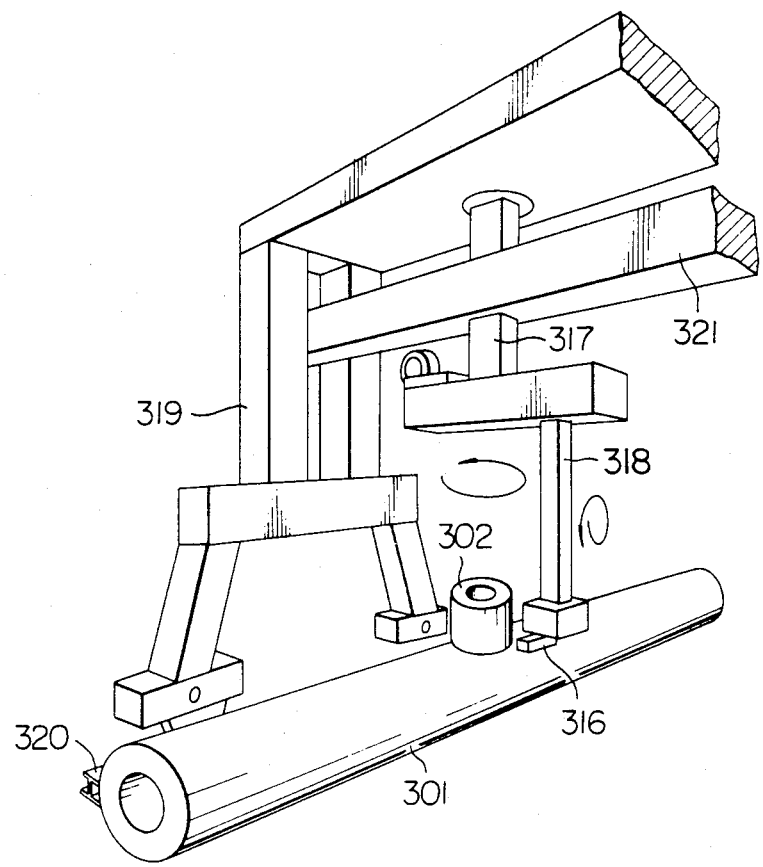
FIG. 28 is a perspective view of the gas metal arc (GMA) branch tube automatic welding device used in working the invention.

FIG. 28 is a perspective view of a GMA branch tube automatic welding apparatus used for working the invention. Operation of the welding head 316 requires the saddle shape drive of the welding head conforming to the curvature of the surface of the base tube as described hereinabove. This has been achieved by driving a head rotating shaft 317 and a head vertically moving shaft 318 in accordance with the usual memory follow-up system by means of a microcomputer.

A head support body 319 moves on rails 320 and stops at an arbitrarily selected position. The numeral 321 designates a rough adjustment beam for setting the position of the welding head 316 by rough adjustments.

By mounting a gas cutting torch, not shown, on the outer casing of the welding head 316 in place of the welding head 316, it is possible to readily form a gas cutting groove of the saddle shape for both the base tube and the branch tube for keeping constant the angle of inclination $\beta$ with respect to the center axis, to enable edge preparation to be carried out with increased accuracy.

By virtue of the present invention, it is possible to form a groove of the same shape through the entire circumference by forming the groove on the base tube side and inserting the branch tube (which is generally referred to as a set-in type mounting) while it has been the usual practice to mount the branch tube by placing the same on the base tube (which is generally referred to as a set-on type mounting), thereby enabling edge preparation (gas cutting) and automation of welding to be achieved. Since the GMA welding means is able to carry out welding at low thermal input (21 KJ/cm), it is possible to produce a weld of high toughness having superior mechanical properties. In addition, the paucity of diffusive hydrogen results in low hydrogen brittleness and improved heat treatment condition. Owing to the facts that the narrow groove welding method used uses a small amount of welding metal and the welding method is automated, the working expenses are lower by about 70% than the corresponding amount required in a method of the prior art, including an edge preparation step.

What is claimed is:

1. A three o'clock welding method in a narrow groove for forming a lateral abutted joint, the method comprising the steps of: forming a groove which tilts such that the center face of upper and lower groove faces substantially parallel to each other is lowered with respect to the horizontal on an initial layer side, and welding by depositing molten metal in a narrow groove in layers, with each layer being formed by a single pass of a welding means, and wherein an angle of inclination of said center face with respect to the horizontal is selected in accordance with a gap dimension of the narrow groove.

2. A three o'clock welding method in a narrow groove as claimed in claim 1, further comprising the step of ejecting an inert gas through a nozzle of the welding means at a predetermined velocity for preventing a formed molten bead from flowing downwardly when the bead is formed, and wherein a thickness and heat conductivity of a base material, and a surface tension of molten metal when a welding wire is melted to form the molten metal are used as factors for determining the angle of inclination of the center face.

3. A three o'clock welding method in a narrow groove the method comprising the steps of: forming a groove which tilts such that the center face of upper and lower groove faces substantially parallel to each other is lowered with respect to a horizontal on an initial layer side, and welding by depositing molten metal in the narrow groove in layers, with each layer being formed by a single pass of a welding means, an angle of inclination of said center face with respect to the horizontal is selected in accordance with a gap dimension of the narrow groove, and wherein when a base material is steel, the gap dimension of the narrow groove is about 8-12 mm and the angle of inclination of the center face of the groove with respect to the horizontal is less than 45°.

4. A three o'clock welding method in a narrow groove as claimed in claim 1, wherein the angle of inclination of a tangent to a bead face at the center point of the bead face in a cross section of a weld with respect to the horizontal is measured after test welding is carried out by using a test piece of the angle of an inclination of zero, so as to select the angle of inclination.

5. In a three o'clock welding method in a narrow groove for forming a transverse butt welded joint by an upwardly advancing and/or a downwardly advancing welding, comprising the steps of:

forming a groove which tilts such that the center face of upper and lower groove faces substantially parallel to each other is lowered with respect to the horizontal on the initial layer side; and controlling the amount of shield gas ejected through nozzles located anteriorly and posteriorly with respect to the direction of welding performed by means of a welding torch in accordance with the position of welding so as to prevent a molten bead from flowing downwardly toward the horizontal.

6. A three o'clock welding method in a narrow groove for directly joining a branch tube to a base tube, the method comprising the steps of:

forming an end face of said branch tube on a curved surface described by one generating line of an inverted trapezoidal cone having an end face of a diameter equal to that of the branch tube as said inverted trapezoidal cone moves axially at a constant distance in two reciprocatory movements in one complete revolution about a center axis thereof;

forming the narrow groove between said end face of the branch tube and a wall of the base tube, said narrow groove being inclined in such a manner that an initial weld layer side is lower with respect to a horizontal on the initial layer side; and automatically welding the branch tube to the base tube so as to join the same to each other.

7. A three o'clock welding method in a narrow groove as claimed in claim 6, further comprising the step of supplying a welding wire to a welding head while forming the welding wire in wave shape, so as to join the branch tube to the base tube by GMA automatic welding.

8. A three o'clock welding method in a narrow groove as claimed in claim 6, further comprising the step of attaching a backing strip of the tubular shape in a branch tube when the automatic welding is carried out.

9. A three o'clock welding method in a narrow groove as claimed in one of claims 6 or 7, further comprising the step of arranging a backing strip of a tubular shape in such a manner that an end portion view of on the base tube side is prevented from sticking out of an inner surface of the base tube.

10. A three o'clock welding method in a narrow groove as claimed in one of claims 6 or 7, further comprising the step of moving the welding head in saddle shape movement necessary for welding of the branch tube to the base tube in accordance with instructions given by a microcomputer by a memory follow-up system.

11. A three o'clock welding method in a narrow groove as claimed in claim 10, wherein a gas cutting torch is mounted in place of a welding head or on the welding head for carrying out an edge preparation for the base tube and the branch tube.

12. A three o'clock welding method in a narrow groove for forming a lateral abutted joint, the method comprising the steps of forming a groove which tilts such that the center face of upper and lower groove faces substantially parallel to each other is lowered with respect to the horizontal on an initial layer side, welding by depositing molten metal in the narrow groove in layers, with each layer being formed by a single pass of a welding means, ejecting an inert gas through a nozzle of the welding means at a predetermined velocity for preventing a preventing a formed molten bead from flowing downwardly when the bead is formed, and wherein a thickness and heat conductivity of a base material, and a surface tension of the molten metal when a welding wire is melted to form the molten metal are used as factors for determining the angle of inclination of the center face.

13. A three o'clock welding method in a narrow groove for forming a lateral abutted joint, the method comprising the steps of: forming a groove which tilts such that a center face of upper and lower groove faces substantially parallel to each other is lowered with respect to the horizontal on an initial layer side, and welding by depositing molten metal in the narrow groove in layers, with each layer being formed by a single pass of a welding means, and wherein an angle of inclination of a tangent to a bead face at a center point of the bead face in a cross section of the weld with respect to the horizontal is measured after test welding is carried out by using a test piece of the angle of an inclination of zero, so as to select the angle of inclination.

* * * * *